(12) United States Patent
Edwards et al.

(10) Patent No.: US 11,512,670 B2
(45) Date of Patent: Nov. 29, 2022

(54) EVAPORATIVE EMISSIONS CONTROL FOR A VEHICLE

(71) Applicant: Polaris Industries Inc., Medina, MN (US)

(72) Inventors: Lindsay S. B. Edwards, Roseau, MN (US); Joel B. Kelso, Star Prairie, WI (US)

(73) Assignee: Polaris Industries Inc., Medina, MN (US)

( * ) Notice: Subject to any disclaimer, the term of this patent is extended or adjusted under 35 U.S.C. 154(b) by 476 days.

(21) Appl. No.: 16/502,573

(22) Filed: Jul. 3, 2019

(65) Prior Publication Data

US 2021/0003101 A1 Jan. 7, 2021

(51) Int. Cl.

| *F02M 25/08* | (2006.01) |
| *B60K 15/035* | (2006.01) |
| *B60R 9/06* | (2006.01) |
| *B60K 15/00* | (2006.01) |
| *B60K 15/063* | (2006.01) |
| *B60K 15/03* | (2006.01) |

(52) U.S. Cl.
CPC .......... *F02M 25/089* (2013.01); *B60K 15/00* (2013.01); *B60K 15/03504* (2013.01); *B60K 15/063* (2013.01); *B60R 9/06* (2013.01); *B60K 2015/03072* (2013.01); *B60K 2015/0637* (2013.01)

(58) Field of Classification Search
CPC .... F02M 25/089; B60K 15/00; B60K 15/063; B60K 2015/03072; B60K 2015/0637; B60K 2015/03514; B60K 2015/03523; B60K 2015/03528; B60R 9/06; B60Y 2200/12

See application file for complete search history.

(56) References Cited

U.S. PATENT DOCUMENTS

| 4,381,753 A | 5/1983 | Yuzawa et al. |
| 4,727,955 A | 3/1988 | Honda et al. |
| 4,853,009 A | 8/1989 | Turner et al. |

(Continued)

FOREIGN PATENT DOCUMENTS

| CA | 2736158 A1 | 3/2010 |
| CN | 104743015 A | 7/2015 |

(Continued)

*Primary Examiner* — Steve Clemmons
(74) *Attorney, Agent, or Firm* — Faegre Drinker Biddle & Reath LLP

(57) ABSTRACT

An all-terrain vehicle ("ATV") comprising a frame, a plurality of ground engaging members supporting the frame, a straddle seat coupled to the frame for supporting at least one rider, a powertrain assembly operably coupled to the ground engaging members, the powertrain assembly comprising an engine, a storage container coupled to the frame at a position rearward of the straddle seat, an exterior surface of the storage container including an indentation, and a fuel system fluidly coupled to the engine, the fuel system including a fuel tank, a fuel vapor line fluidly coupling the fuel tank to the engine, and an evaporation canister positioned along the fuel vapor line, wherein the evaporation canister is positioned within the indentation in an exterior surface of the storage container.

23 Claims, 15 Drawing Sheets

(56) References Cited

U.S. PATENT DOCUMENTS

| | | |
|---|---|---|
| 4,951,637 A | 8/1990 | Cook |
| 5,058,693 A | 10/1991 | Murdock et al. |
| 5,477,836 A | 12/1995 | Hyodo et al. |
| 5,647,333 A | 7/1997 | Mukai |
| 5,702,125 A | 12/1997 | Nakajima et al. |
| 5,806,500 A | 9/1998 | Fargo et al. |
| 5,817,925 A | 10/1998 | Cook et al. |
| 5,988,145 A | 11/1999 | Horiuchi et al. |
| 6,105,708 A | 8/2000 | Amano et al. |
| 6,308,987 B1 | 10/2001 | Mitake |
| 6,363,920 B1 | 4/2002 | Parker et al. |
| 6,460,517 B1 | 10/2002 | Dauer |
| 6,893,047 B2 | 5/2005 | Chou et al. |
| 7,008,470 B2 | 3/2006 | Makino et al. |
| 7,237,644 B2 | 7/2007 | Matsumoto et al. |
| 7,322,343 B2 | 1/2008 | Yamada et al. |
| 7,438,058 B2 | 10/2008 | Ito et al. |
| 7,507,278 B2 | 3/2009 | Makino et al. |
| 7,753,034 B2 | 7/2010 | Hoke et al. |
| 7,810,842 B2 | 10/2010 | Ichikawa |
| 7,841,624 B2 | 11/2010 | Kobayashi et al. |
| 7,998,257 B2 | 8/2011 | Makino et al. |
| 8,087,486 B2 | 1/2012 | Yamamuro |
| 8,113,312 B2 | 2/2012 | Seki et al. |
| 8,118,128 B2 | 2/2012 | Shimura et al. |
| 8,141,672 B2 | 3/2012 | Kuramochi et al. |
| 8,215,677 B2 | 7/2012 | Hosoya et al. |
| 8,251,048 B2 | 8/2012 | Kusa |
| 8,256,557 B2 | 9/2012 | Suzuki |
| 8,276,702 B2 | 10/2012 | Inaoka |
| 8,276,944 B2 | 10/2012 | Inaoka |
| 8,342,282 B2 * | 1/2013 | Kuramochi ............... B62J 37/00 180/219 |
| 8,342,358 B2 | 1/2013 | Kobayashi et al. |
| 8,343,263 B2 | 1/2013 | Murayama et al. |
| 8,418,794 B2 | 4/2013 | Shibata et al. |
| 8,443,786 B2 | 5/2013 | Yamasaki |
| 8,448,629 B2 | 5/2013 | Makino et al. |
| 8,448,734 B2 | 5/2013 | Maeda et al. |
| 8,448,737 B2 | 5/2013 | Hasegawa |
| 8,490,733 B2 | 7/2013 | Kitta |
| 8,560,167 B2 | 10/2013 | Jentz et al. |
| 8,573,183 B2 | 11/2013 | Graham et al. |
| 8,646,668 B2 * | 2/2014 | Oakes .................... B60R 9/065 224/401 |
| 8,725,347 B2 | 5/2014 | Jentz et al. |
| 8,726,888 B2 | 5/2014 | Yoshida et al. |
| 8,752,661 B2 | 6/2014 | Nagura et al. |
| 8,851,523 B2 | 10/2014 | Shiina et al. |
| 8,864,877 B2 | 10/2014 | Nishita et al. |
| 8,899,367 B2 | 12/2014 | Hayashi et al. |
| 8,905,005 B2 | 12/2014 | Shimura et al. |
| 8,931,459 B2 | 1/2015 | Sotiriades |
| 8,992,673 B2 | 3/2015 | Mani |
| 9,022,008 B2 | 5/2015 | Hirukawa |
| 9,133,797 B2 | 9/2015 | Shomura et al. |
| 9,199,684 B2 * | 12/2015 | Hara .................. F02M 25/0836 |
| 9,809,110 B2 | 11/2017 | Nakamura et al. |
| 9,815,364 B2 | 11/2017 | Sharkar |
| 9,879,623 B2 | 1/2018 | Dekar et al. |
| 9,957,924 B2 | 5/2018 | Dudar |
| 9,970,391 B2 | 5/2018 | Sager et al. |
| 10,227,954 B2 | 3/2019 | Kim et al. |
| 10,399,435 B2 * | 9/2019 | Bastien ............ B60K 15/03504 |
| 2001/0047723 A1 | 12/2001 | Miura et al. |
| 2004/0075269 A1 | 4/2004 | Chou et al. |
| 2004/0200356 A1 | 10/2004 | Kuperus |
| 2005/0211496 A1 | 9/2005 | Ito et al. |
| 2005/0241480 A1 | 11/2005 | Lebowitz et al. |
| 2006/0043131 A1 * | 3/2006 | Graham ................. B62M 27/02 224/408 |
| 2006/0065253 A1 | 3/2006 | Reddy |
| 2007/0266997 A1 | 11/2007 | Clontz et al. |
| 2008/0041226 A1 | 2/2008 | Hiltzik et al. |
| 2008/0149075 A1 | 6/2008 | Toyoda et al. |
| 2009/0013973 A1 | 1/2009 | Yamasaki |
| 2009/0195035 A1 * | 8/2009 | Ripley .................... B62J 11/00 297/195.13 |
| 2010/0078241 A1 | 4/2010 | Maeda et al. |
| 2010/0243355 A1 | 9/2010 | Hosoya et al. |
| 2010/0243358 A1 * | 9/2010 | Suzuki .................. B62K 11/04 180/219 |
| 2011/0073399 A1 | 3/2011 | Seki |
| 2011/0168025 A1 | 7/2011 | Huynh |
| 2011/0297127 A1 | 12/2011 | Aso |
| 2013/0247881 A1 | 9/2013 | Okubo et al. |
| 2014/0060955 A1 | 3/2014 | Kono |
| 2015/0184621 A1 | 7/2015 | Arase et al. |
| 2016/0229476 A1 | 8/2016 | Yasuta et al. |
| 2016/0313171 A1 | 10/2016 | Dudar et al. |
| 2017/0152798 A1 | 6/2017 | Casetti et al. |
| 2017/0190247 A1 | 7/2017 | Sharkar |
| 2017/0226966 A1 | 8/2017 | Koga et al. |
| 2017/0296962 A1 | 10/2017 | Menke et al. |
| 2017/0342919 A1 | 11/2017 | Dekar et al. |
| 2017/0342946 A1 | 11/2017 | Sager et al. |
| 2018/0030932 A1 | 2/2018 | Dudar |
| 2018/0030933 A1 | 2/2018 | Kim et al. |
| 2018/0080416 A1 | 3/2018 | Choi et al. |
| 2018/0142634 A1 | 5/2018 | Sager et al. |
| 2020/0276900 A1 * | 9/2020 | Tabuchi ........... B60K 15/03177 |
| 2020/0339206 A1 * | 10/2020 | Tabuchi ................... B62J 37/00 |

FOREIGN PATENT DOCUMENTS

| | | | |
|---|---|---|---|
| CN | 106812617 A | 6/2017 | |
| CN | 107842446 A | 3/2018 | |
| DE | 102016122407 A1 | 6/2017 | |
| DE | 102016106920 A1 | 10/2017 | |
| DE | 102016208787 A1 | 11/2017 | |
| DE | 102016224973 A1 | 3/2018 | |
| EP | 2063098 A1 | 5/2009 | |
| EP | 2071172 A1 | 6/2009 | |
| EP | 2143584 A1 | 1/2010 | |
| EP | 2264305 A1 | 12/2010 | |
| EP | 2326824 | 6/2011 | |
| EP | 2607677 A1 * | 6/2013 | ............... B62J 35/00 |
| EP | 2769902 A1 | 8/2014 | |
| EP | 3184408 A1 * | 6/2017 | ............... B62J 37/00 |
| EP | 3189997 A1 | 7/2017 | |
| IN | 201003277 | 11/2011 | |
| IN | 201101885 | 12/2011 | |
| IN | 201500396 | 7/2016 | |
| IN | 201501944 | 10/2016 | |
| JP | 2000-345929 A | 12/2000 | |
| JP | 2001-342921 A | 12/2001 | |
| JP | 2002-013445 A | 1/2002 | |
| JP | 2002-266709 A | 9/2002 | |
| JP | 3336912 B2 | 10/2002 | |
| JP | 3343569 B2 | 11/2002 | |
| JP | 2003-237390 A | 8/2003 | |
| JP | 2004-293296 A | 10/2004 | |
| JP | 3666645 B2 | 6/2005 | |
| JP | 2006-070785 A | 3/2006 | |
| JP | 2007-146793 A | 6/2007 | |
| JP | 2007-196967 A | 8/2007 | |
| JP | 2008-248795 A | 10/2008 | |
| JP | 2009-002267 A | 1/2009 | |
| JP | 2009-137583 A | 6/2009 | |
| JP | 2009-215901 A | 9/2009 | |
| JP | 4355312 B2 | 10/2009 | |
| JP | 2010-155506 A | 7/2010 | |
| JP | 2012-132402 A | 7/2012 | |
| JP | 5154506 B2 | 2/2013 | |
| JP | 2013-067270 A | 4/2013 | |
| JP | 2013-067272 A | 4/2013 | |
| JP | 2013-067277 A | 4/2013 | |
| JP | 2013-067296 A | 4/2013 | |
| JP | 2013-189200 A | 9/2013 | |
| JP | 5461564 | 4/2014 | |
| JP | 5481254 B2 | 4/2014 | |
| JP | 5721599 B2 | 5/2015 | |
| JP | 5908012 B2 | 4/2016 | |
| JP | 5970491 B2 | 8/2016 | |

(56) References Cited

FOREIGN PATENT DOCUMENTS

| | | | | |
|---|---|---|---|---|
| JP | 6002707 B2 | 10/2016 | | |
| JP | 6019053 B2 | 11/2016 | | |
| JP | 6019569 B2 | 11/2016 | | |
| JP | 2017105286 A * | 6/2017 | ....... | B60K 15/03504 |
| JP | 2017-141719 A | 8/2017 | | |
| JP | 2017-189770 A | 10/2017 | | |
| JP | 2018103873 A * | 7/2018 | .............. | B62J 35/00 |
| JP | 2019105204 A * | 6/2019 | ............. | B60K 17/22 |
| KR | 10-1291025 B1 | 7/2013 | | |
| KR | 2017-0111962 A | 10/2017 | | |
| KR | 10-2018-0031189 A | 3/2018 | | |
| KR | 10-1853484 B1 | 4/2018 | | |
| TH | 61921 | 5/2004 | | |
| VN | 10011772 | 10/2013 | | |
| VN | 42800 | 7/2015 | | |
| VN | 44858 | 12/2015 | | |
| WO | 2008/027935 A1 | 3/2008 | | |
| WO | 2008/027938 A1 | 3/2008 | | |
| WO | 2009/098806 A1 | 8/2009 | | |
| WO | 2010/003277 A1 | 1/2010 | | |
| WO | 2010/032065 A1 | 3/2010 | | |
| WO | 2013/094549 A1 | 6/2013 | | |
| WO | 2013/094631 A1 | 6/2013 | | |
| WO | WO-2013094631 A1 * | 6/2013 | .............. | B62J 37/00 |
| WO | 2014/112959 A1 | 7/2014 | | |
| WO | WO-2014112959 A1 * | 7/2014 | .............. | B62J 37/00 |
| WO | 2014/158102 A1 | 10/2014 | | |
| WO | 2014/158103 A1 | 10/2014 | | |
| WO | 2015/048492 A1 | 4/2015 | | |
| WO | 2015/199106 A1 | 12/2015 | | |
| WO | 2016/021245 A1 | 2/2016 | | |
| WO | 2016/021246 A1 | 2/2016 | | |
| WO | 2016/021247 A1 | 2/2016 | | |
| WO | 2016/156893 A1 | 10/2016 | | |
| WO | 2017/074985 A1 | 5/2017 | | |
| WO | 2017/077317 A1 | 5/2017 | | |
| WO | 2017/181084 A1 | 10/2017 | | |
| WO | 2017/198466 A1 | 11/2017 | | |
| WO | 2018/013781 A1 | 1/2018 | | |

* cited by examiner

EVAPORATIVE EMISSIONS CONTROL FOR A VEHICLE

BACKGROUND OF THE PRESENT DISCLOSURE

The present disclosure generally relates to a fuel system of a vehicle, and more particularly, to a fuel system comprising components configured to reduce evaporative emissions.

Many vehicles, including all-terrain vehicles ("ATVs") and utility vehicles ("UVs"), are required to meet specific emission standards under rules and regulation of federal and state governments. Over time, emission standards have been and are becoming more regulated in an effort to reduce overall emissions emitted from all types of vehicles.

In some vehicles, especially ATVs and UVs which are sized for operation on trails, the packaging of the fuel system may be difficult in combination with other systems of the vehicle. More particularly, the inclusion of the components configured to reduce evaporative emissions may be difficult to package with the suspension system, cargo areas, powertrain, etc. As a result, there is a need for improved packaging of the vehicle components to provide space for an evaporative emissions system.

SUMMARY OF THE PRESENT DISCLOSURE

In one embodiment of the present disclosure, an all-terrain vehicle ("ATV") comprises a frame, a plurality of ground engaging members supporting the frame, a straddle seat coupled to the frame for supporting at least one rider, a powertrain assembly operably coupled to the ground engaging members, the powertrain assembly comprising an engine, a storage container coupled to the frame at a position rearward of the straddle seat, an exterior surface of the storage container including an recess, and a fuel system fluidly coupled to the engine, the fuel system including a fuel tank, a fuel vapor line fluidly coupling the fuel tank to the engine, and an evaporation canister positioned along the fuel vapor line, wherein the evaporation canister is positioned within the recess in the exterior surface of the storage container.

In another embodiment of the present disclosure, a vehicle comprises a frame, a body supported by the frame, the body having a front body panel and a rear body panel, a plurality of ground engaging members supporting the frame, a seat coupled to the frame for supporting at least one rider, a powertrain assembly operably coupled to the ground engaging members, the powertrain assembly comprising an engine, an indented member positioned rearward of the seat, and a fuel system fluidly coupled to the engine, the fuel system including a fuel tank, a fuel vapor line fluidly coupling the fuel tank to the engine, and an evaporation canister positioned along the fuel vapor line, wherein at least a portion of the evaporation canister is positioned between an upper-facing surface of the indented member and a bottom surface of the rear body panel.

In yet another embodiment of the present disclosure, a storage container configured to be coupled to a frame of a vehicle comprises a top portion including an upper-facing surface having a recess configured to receive an evaporation canister of the vehicle and a plurality of channels, and a bottom storage portion configured to be coupled to a rear portion of the frame of the vehicle, the bottom storage portion configured to support the top portion.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION OF THE DRAWINGS

Figure 1:
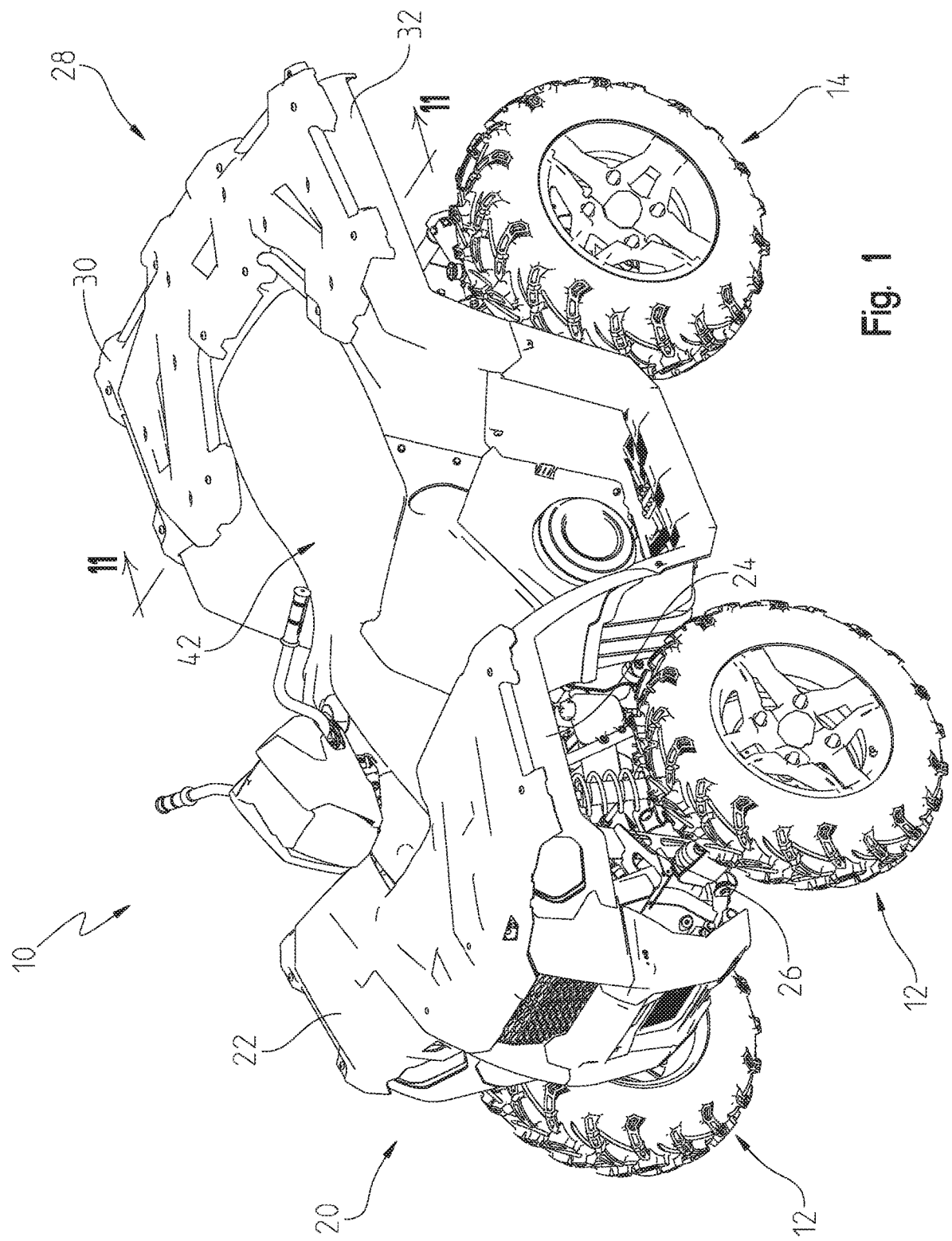
FIG. 1 shows a left front perspective view of an embodiment of a vehicle of the present disclosure.

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to an all-terrain vehicle, it should be understood that the features disclosed herein may have application to other types of vehicles such as utility vehicles, watercraft, snowmobiles, people movers, and golf carts.

Figure 2:
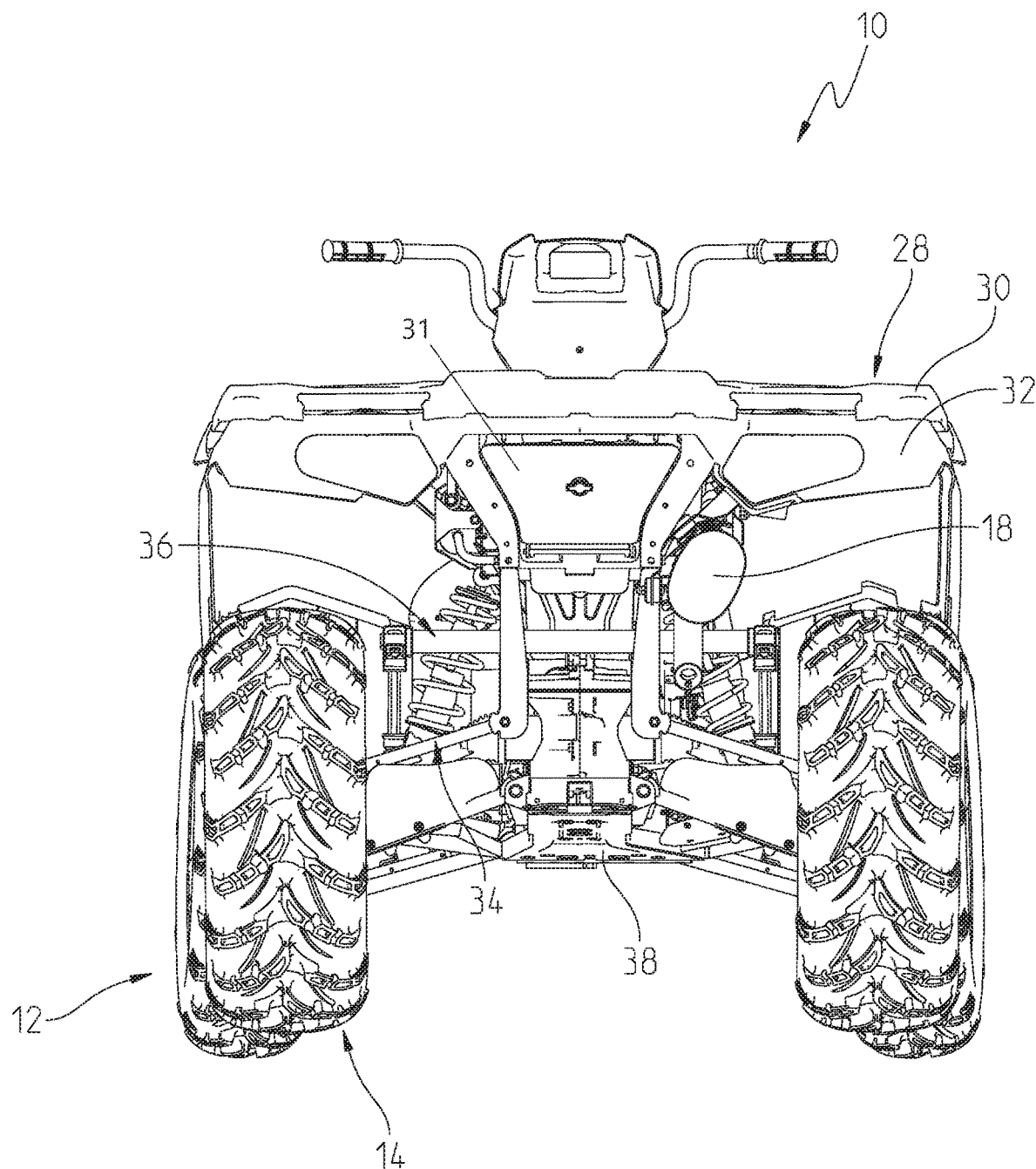
FIG. 2 shows a rear view of the vehicle of FIG. 1.
Figure 3:
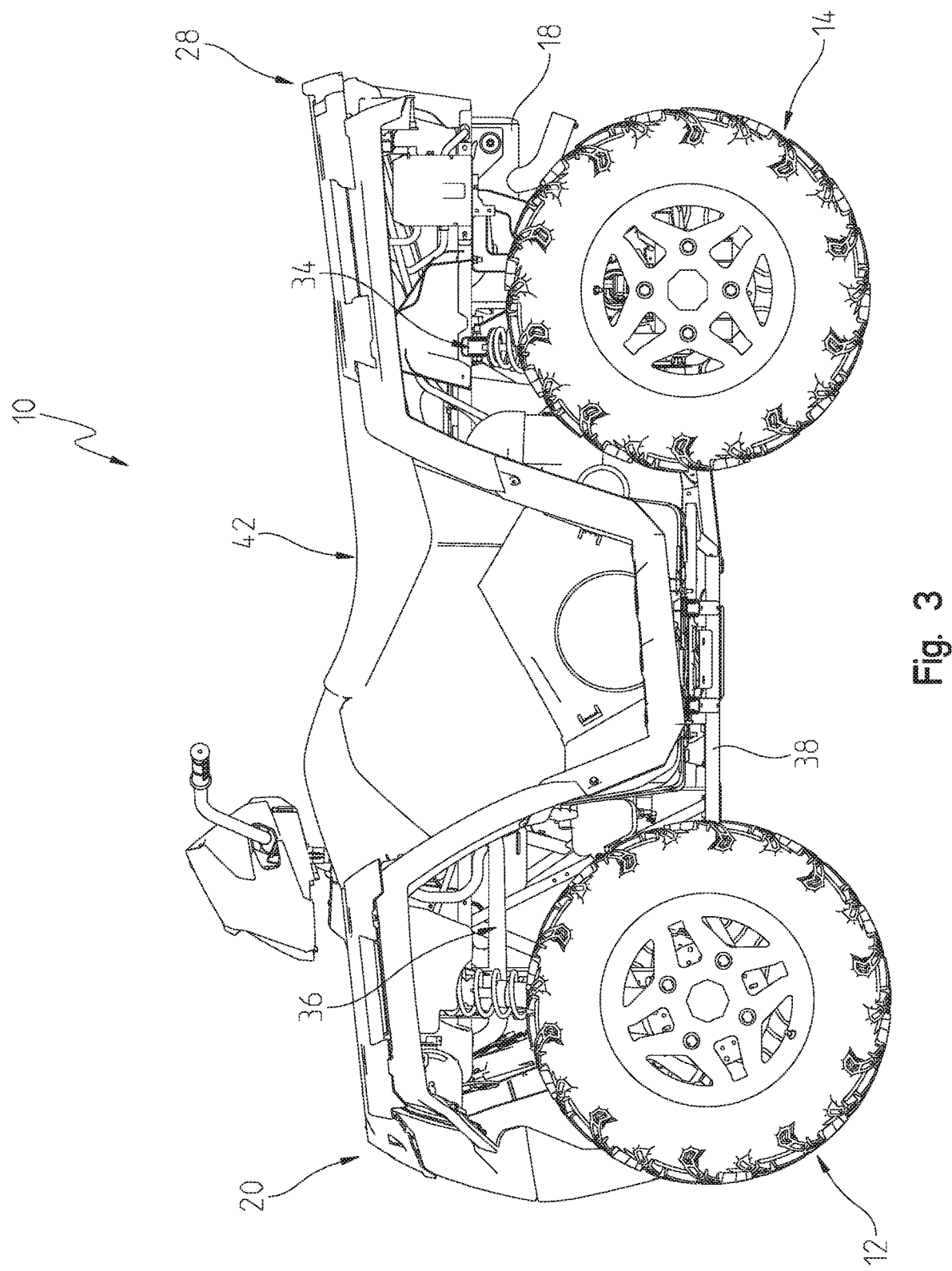
FIG. 3 shows a left side view of the vehicle of FIG. 1.

With reference to FIGS. 1-3, an all-terrain vehicle ("ATV") 10 is configured to be supported on a ground surface with front ground-engaging members, illustratively front wheels 12, and rear ground-engaging members, illustratively rear wheels 14. Front and rear wheels 12, 14 are operably coupled to a brake assembly (not shown). Additionally, front and rear wheels 12, 14 are operably coupled to a powertrain assembly that generally includes an engine 16 (FIGS. 4, 6, and 7) which is operably coupled to an exhaust assembly 18 (FIG. 2).

As shown in FIGS. 1-3, front wheels 12 support a front end 20 of ATV 10 which includes at least a front rack 22, a front body panel 24, and a front suspension assembly 26. Rear wheels 14 support a rear end 28 of ATV 10, which includes at least a rear rack 30, a rear body panel 32, the exhaust assembly 18, and a rear suspension assembly 34.

Figure 4:
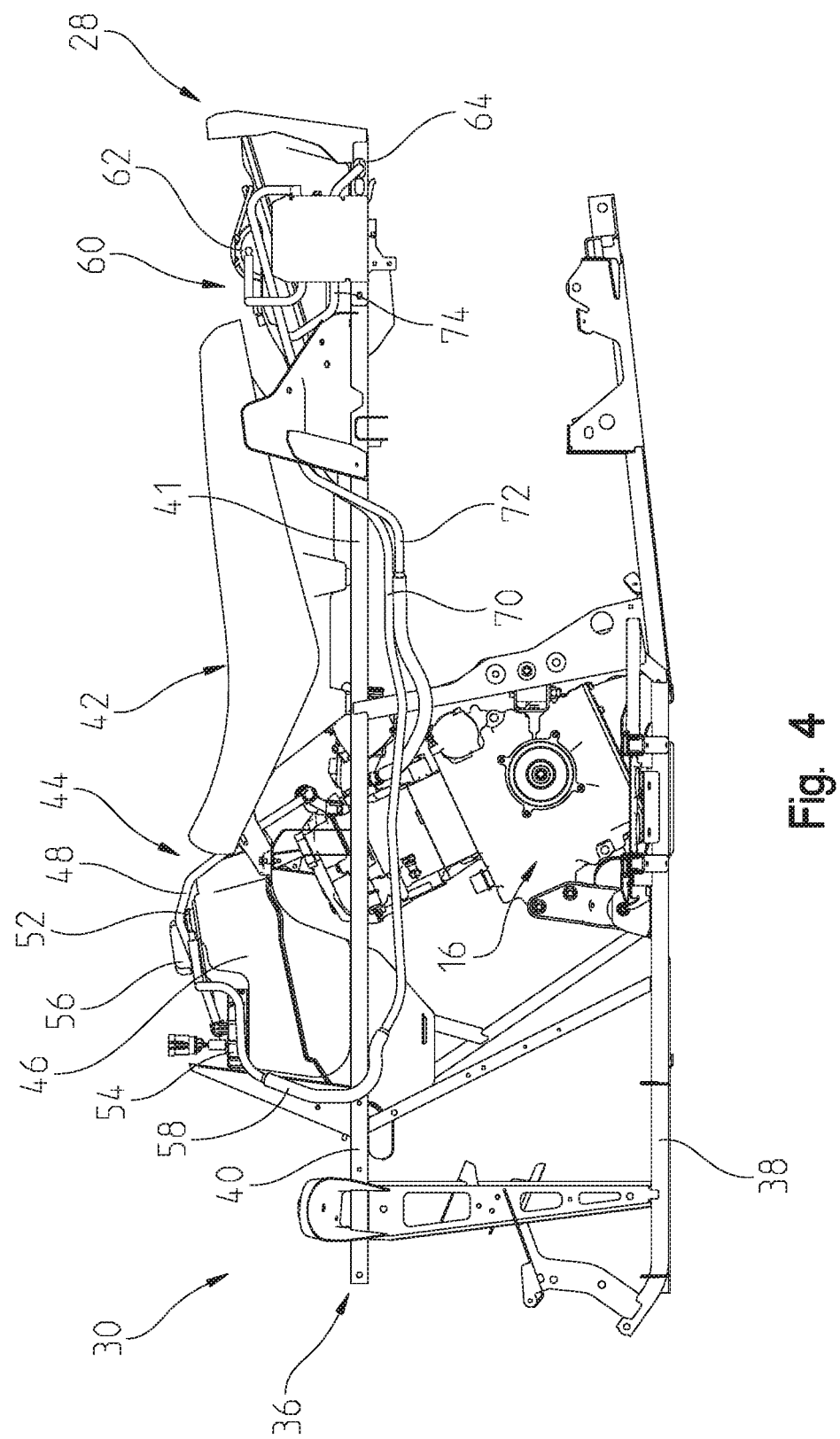
FIG. 4 shows a left side view of an engine, a fuel system, a portion of a frame, a seat, and a storage container of the vehicle of FIG. 1.

With reference to FIGS. 2-4, front and rear wheels 12, 14 of ATV 10 further support a frame assembly 36. Illustratively, frame assembly 36 includes a lower frame assembly 38 as well as an upper frame assembly 40 (FIG. 4). Upper frame assembly 40 includes at least one longitudinal frame member 41 that supports a seat 42 for at least an operator. In various embodiments, seat 42 is a straddle seat configured to support one or two riders. Seat 42 is supported by upper frame assembly 40 between front end 20 and rear end 28.

With reference now to FIGS. 4-7, ATV 10 further includes a fuel system 44 fluidly coupled to engine 16 and generally supported by frame assembly 36. Fuel system 44 generally includes a fuel tank 46 fluidly coupled to engine 16 by a fuel delivery line 48.

Figure 5:
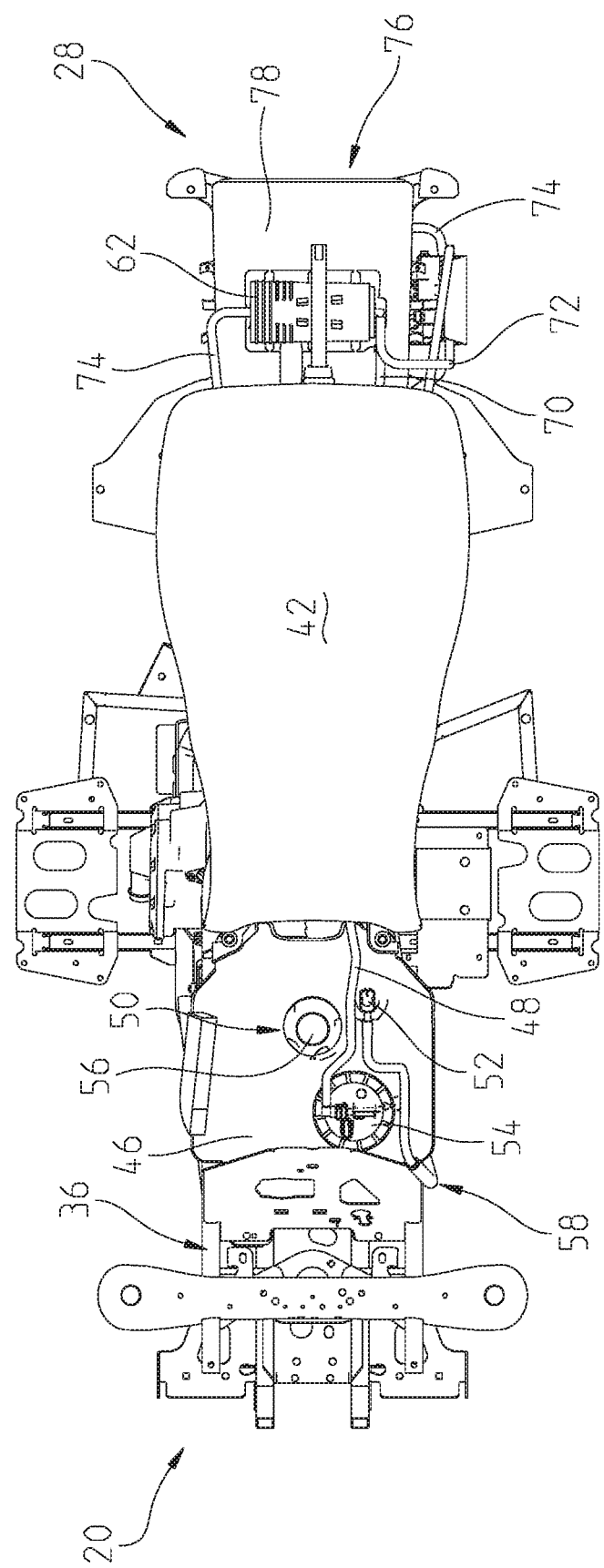
FIG. 5 shows a top plan view of the fuel system, the seat, the engine, the portion of the frame, and the storage container of the vehicle in FIG. 4.

Fuel tank 46 includes a fill opening 50, a vapor exit port 52, and a fuel pump 54, and is generally positioned forward of seat 42 (FIGS. 4 and 5). Fill opening 50 of fuel tank 46 is configured to receive liquid fuel from a fuel delivery apparatus, and generally includes a cap 56 for containing both liquid fuel and fuel vapor within fuel tank 46. Furthermore, fill opening 50 is generally accessible from a top side of fuel tank 46 of ATV 10. Vapor exit port 52 of fuel tank 46 is configured to allow venting of fuel vapors collecting within fuel tank 46, and prevent liquid fuel from escaping fuel tank 46, specifically in the case where ATV 10 is not in an upright position. Accordingly, vapor exit port 52 prevents liquid fuel from entering a fuel vapor line 58 which is configured to receive fuel vapor from fuel tank 46 through vapor exit port 52.

In operation, fuel pump 54 of fuel tank 46 is configured to deliver liquid fuel from fuel tank 46 to engine 16 through fuel delivery line 48 based on the operating conditions of ATV 10, for example based on information received from throttle controls of ATV 10. While fuel is in fuel tank 46, fuel vapor may be present and, therefore, could travel to engine 16 and ultimately exhaust assembly 18; however, the emission of fuel vapor from ATV 10 may be regulated by emissions regulations. As such, it is necessary to contain the fuel vapor within fuel system 44 according to these emissions regulations. Therefore, fuel system 44 of ATV 10 further includes an evaporative emissions control assembly 60 (FIG. 6) to control emission of the fuel vapor from ATV 10.

Still referring to FIGS. 4-7, evaporative emissions control assembly 60 includes fuel vapor line 58 fluidly coupling fuel tank 46 to engine 16, an evaporation or an active carbon canister 62 positioned along fuel vapor line 58 and configured to receive and/or store fuel vapor received from fuel tank 46, a fresh air intake 64 (FIG. 7) coupled to evaporation canister 62 and configured to provide fresh ambient air for mixing with the fuel vapor within evaporation canister 62, an air filter assembly 66 fluidly coupled to fresh air intake 64 to filter the fresh ambient air, and a purge valve 68 positioned along fuel vapor line 58 and configured to control the amount of fuel vapor delivered to engine 16 from fuel tank 46 and/or evaporation canister 62. In various embodiments, fuel vapor line 58 includes a fuel vapor load line 70 extending between fuel tank 46 and evaporation canister 62 and a fuel vapor purge line 72 extending between evaporation canister 62 and engine 16, where purge valve 68 is positioned along fuel vapor purge line 72 of fuel vapor line 58 in order to control the amount of fuel vapor delivered to engine 16. The fresh air provided to canister 62 through fresh air intake 64 flows along a flow path through canister 62 to engine 16 pulling out the fuel vapor from canister 62 and providing the mixture to engine 16.

Evaporative emissions control assembly 60 is configured such that fuel vapor from fuel tank 46, which is positioned forward of seat 42, is vented through vapor exit port 52 and travels through fuel vapor load line 70 of fuel vapor line 58 to evaporation canister 62, which is rearward of seat 42. In this way, fuel system 44 extends between front end 20 and rear end 28 and is generally positioned above or along upper framer assembly 40. This allows for the recovery of fuel vapor within fuel tank 46 such that the vapor may be sent back and used by engine 16 instead of allowing the fuel vapor to escape and evaporate into the air. Evaporation canister 62 adsorbs and stores the fuel vapors from tank 46 until purge valve 68 is opened allowing fuel vapors and air to travel through fuel vapor purge line 72 of fuel vapor line 58 and purge valve 68 and into engine 16. Evaporation canister 62 is also coupled to fresh air intake 64 through air intake line 74 such that ambient air is pulled into evaporation canister 62 through air filter assembly 66, which is positioned along air intake line 74, to mix with the fuel vapors within evaporation canister 62 and create the flow path through the canister when purge valve 68 is opened. In various embodiments, fuel vapor load line 70 may include a check valve or pressure-vent valve (not shown) that pressurizes fuel tank 46 and controls the amount and timing of fuel vapor transferring from fuel tank 46 to evaporation canister 62.

Figure 6:
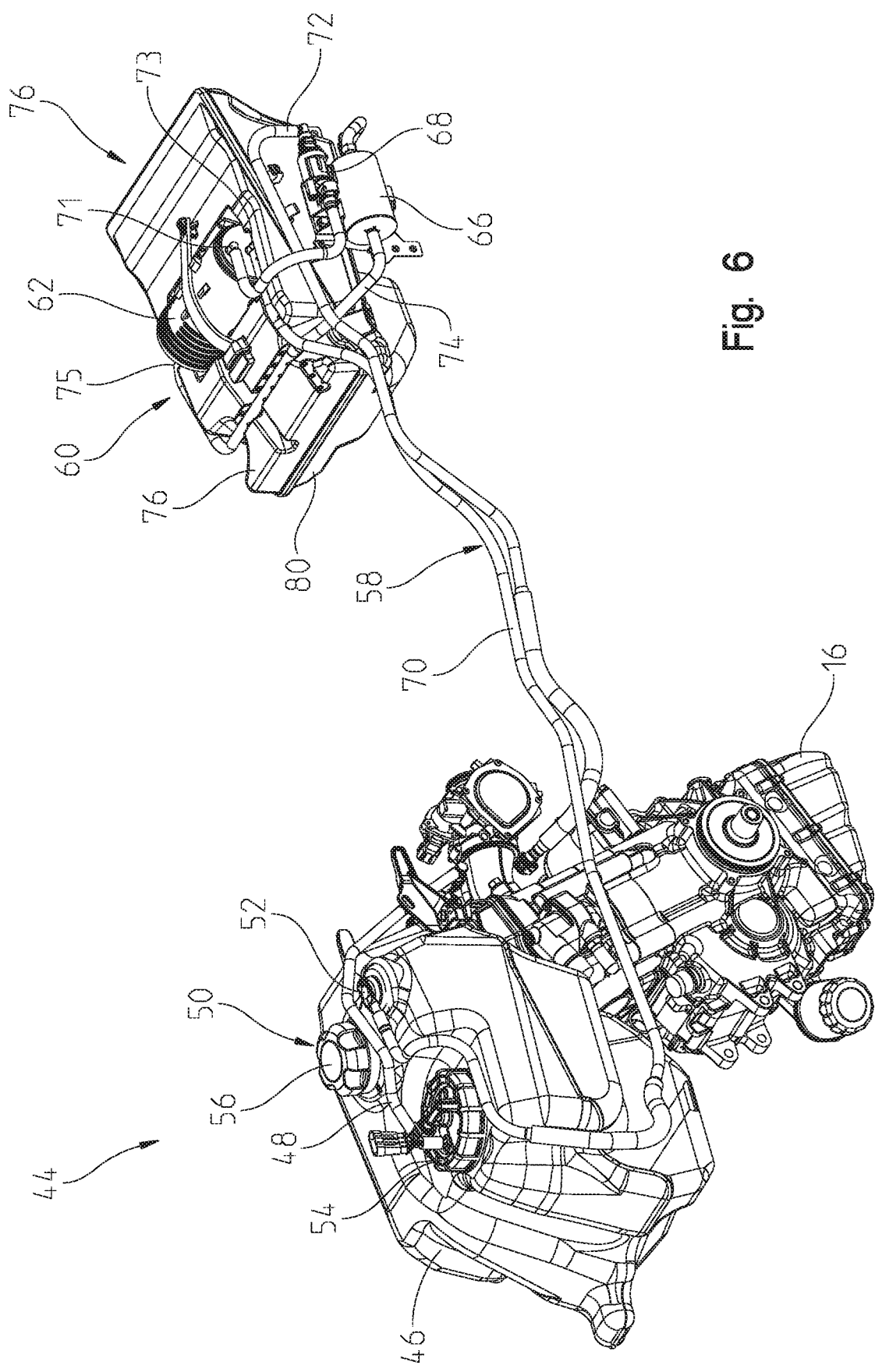
FIG. 6 shows a left front perspective view of the fuel system, the engine, and the storage container of FIG. 4.
Figure 7:
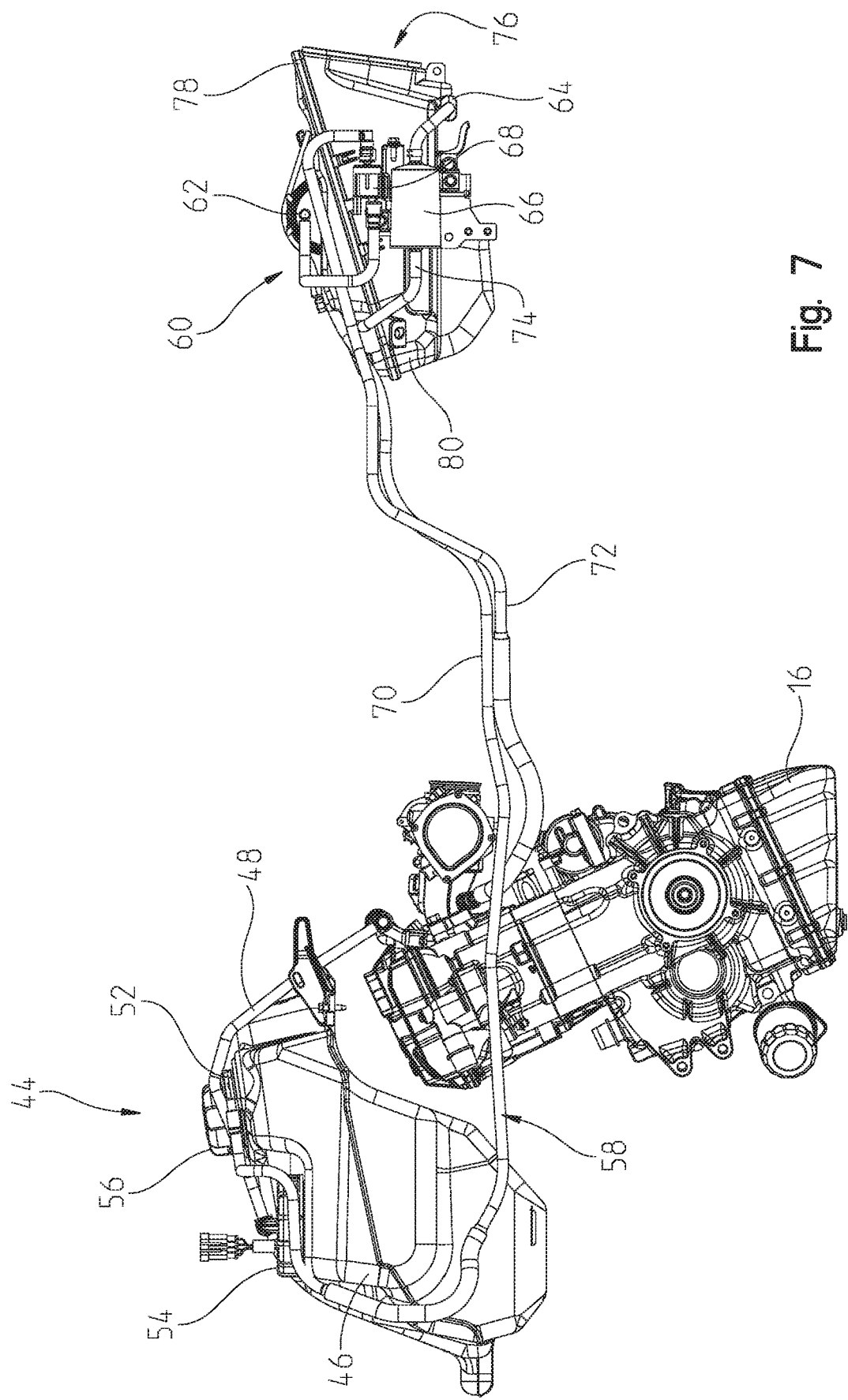
FIG. 7 shows a left side view of the fuel system, the engine, and the storage container of FIG. 6.
Figure 8:
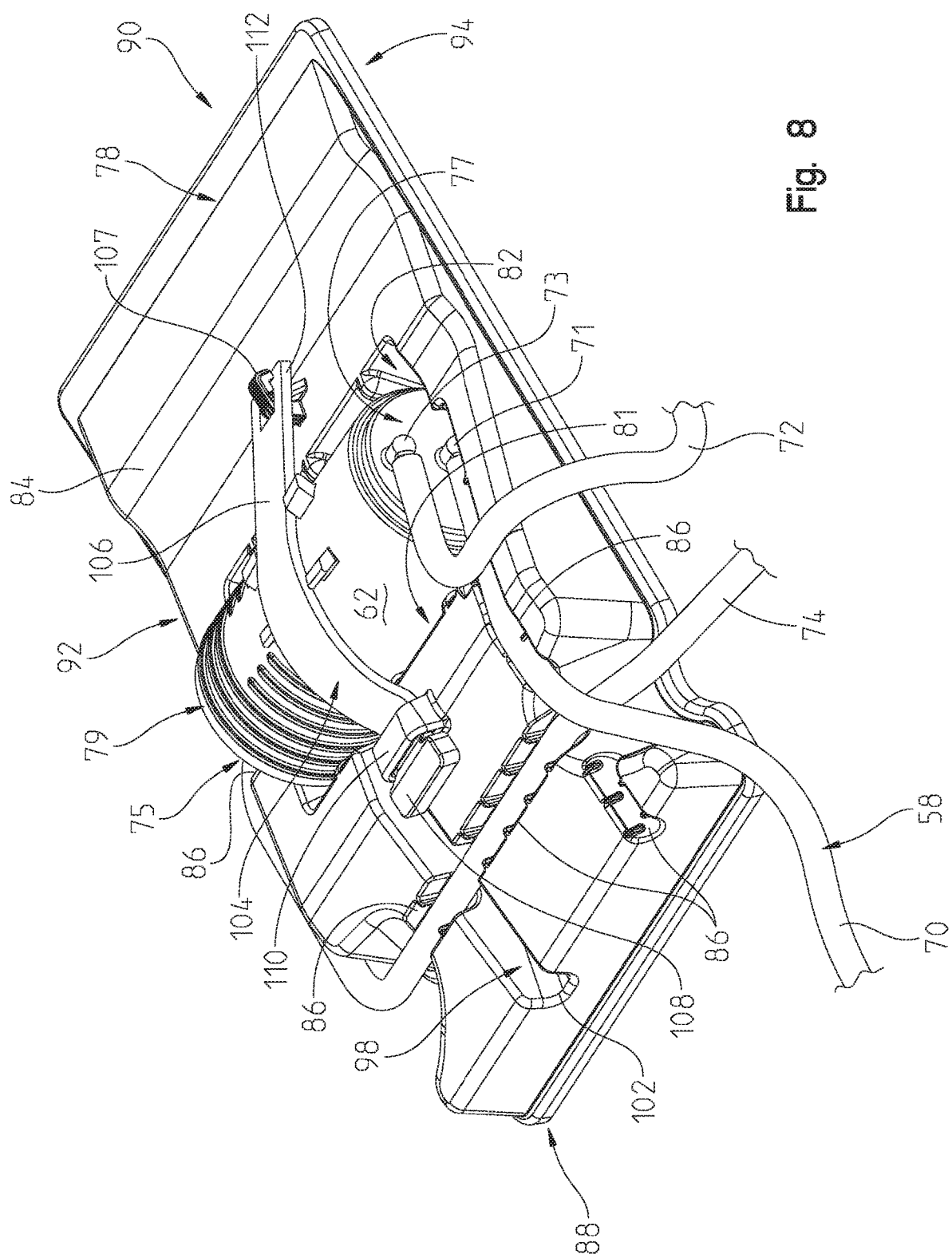
FIG. 8 shows a left front perspective view of a top portion of the storage container and an evaporation canister of the fuel system of FIG. 4.
Figure 9:
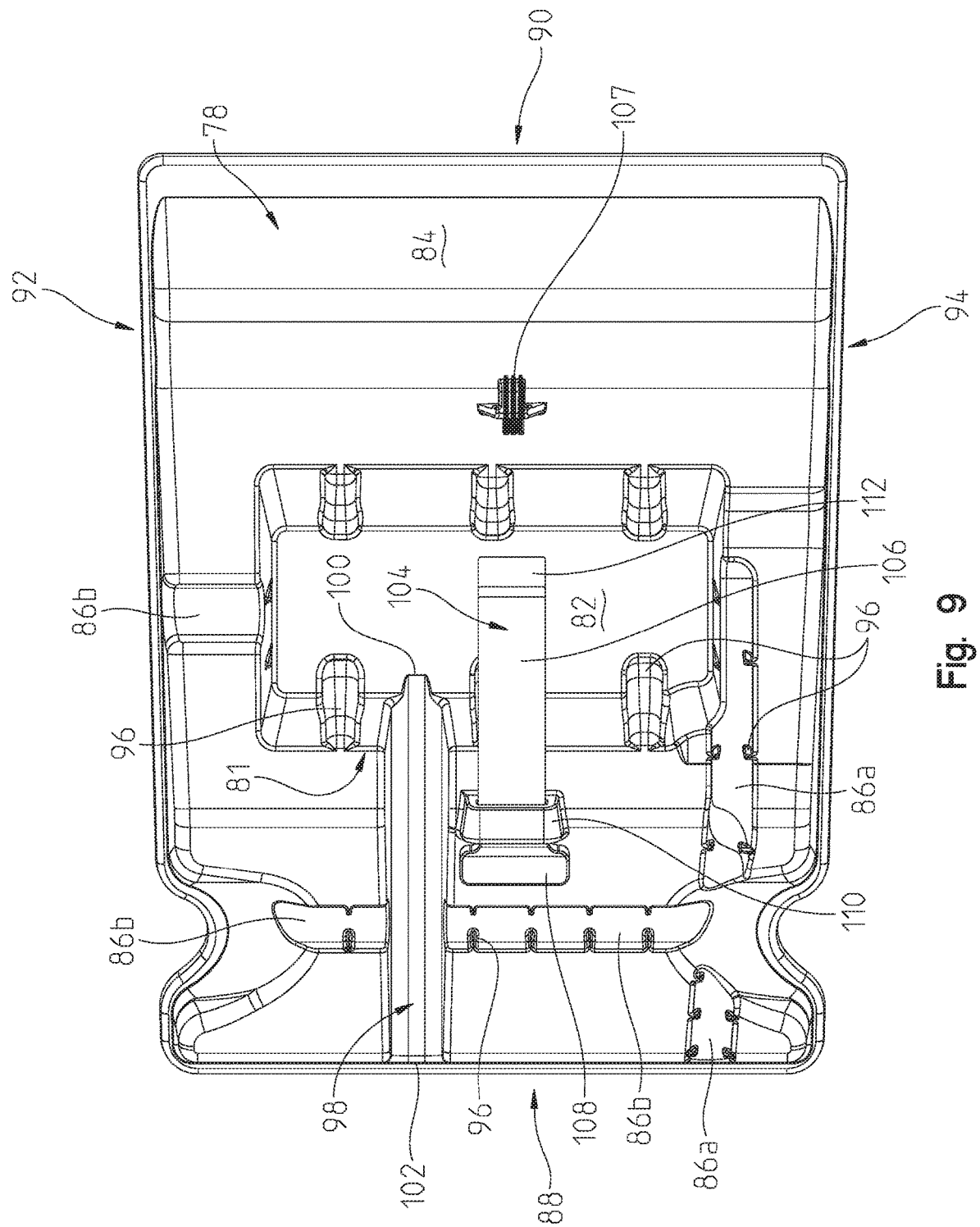
FIG. 9 shows a top plan view of the top portion of the storage container of FIG. 8 with the evaporation canister removed.
Figure 10:
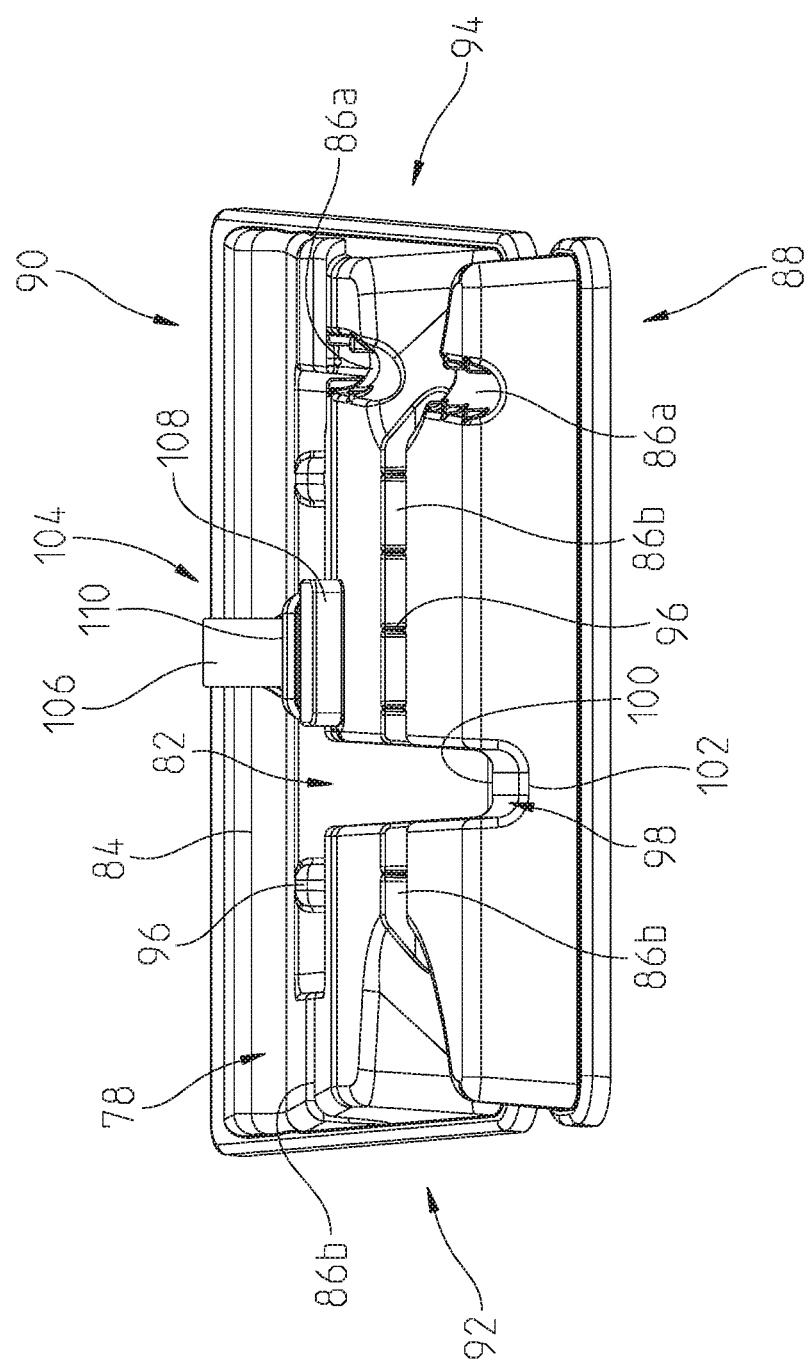
FIG. 10 shows a front plan view of the top portion of the storage container of FIG. 8 with the evaporation canister removed.

As shown in FIGS. 6 and 8, fuel vapor load line 70 is coupled to evaporation canister 62 at load port 71, fuel vapor purge line 72 is coupled to evaporation canister 62 at purge port 73, and air intake line 74 is coupled to evaporation canister 62 at air intake port 75 such that load port 71 is positioned below purge port 73 on a first end or side 77 of evaporation canister 62 and air intake port 75 is on a second end or side 79 of evaporation canister 62. In various embodiments, load port 71 is positioned adjacent to the bottom edge of canister 62 and/or canister 62 may be tilted such that liquid fuel can be prevented from carrying up canister 62.

Figure 11:
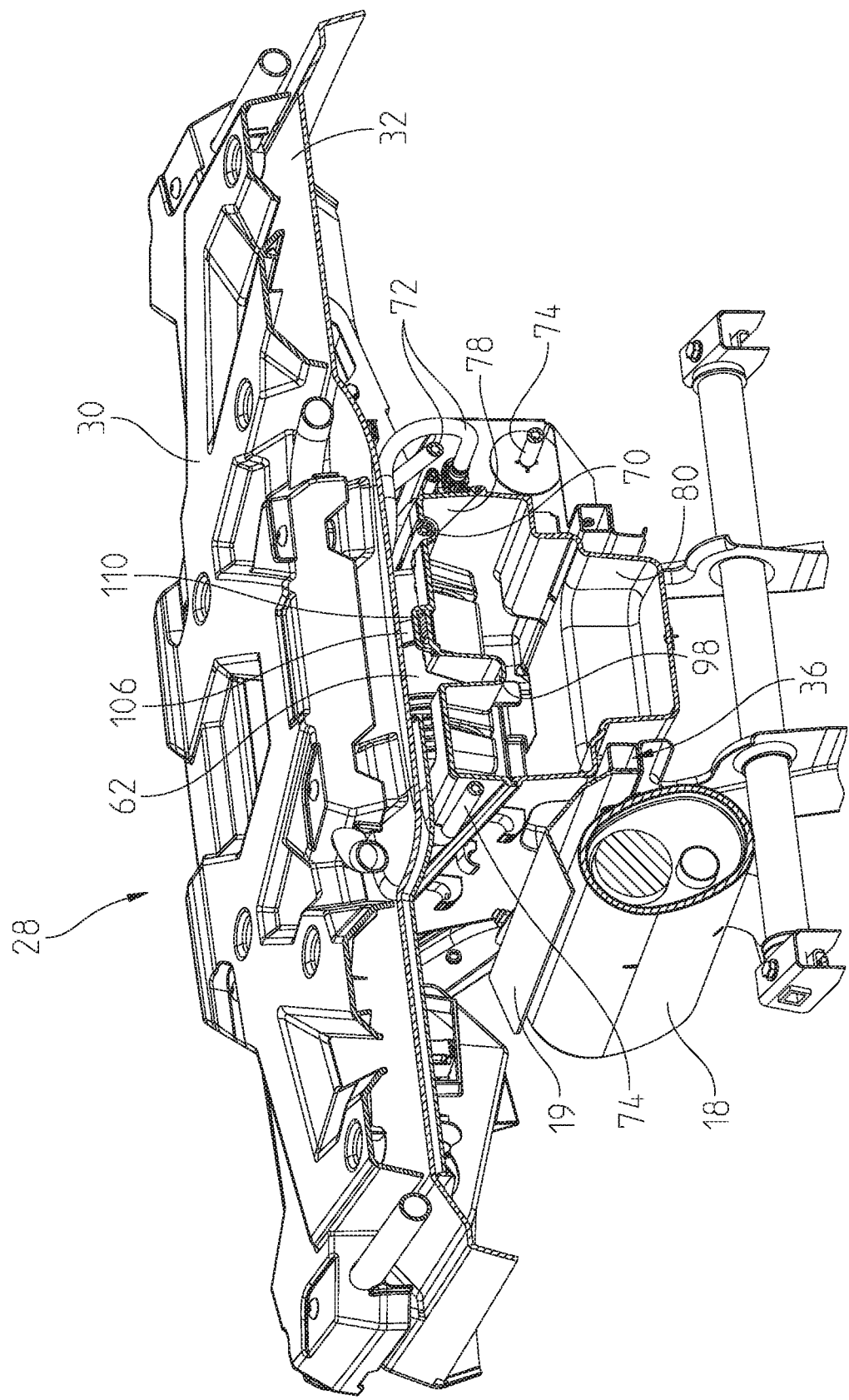
FIG. 11 shows a perspective cross sectional view of a rear portion of the vehicle of FIG. 1 taken along line 11-11.
Figure 12:
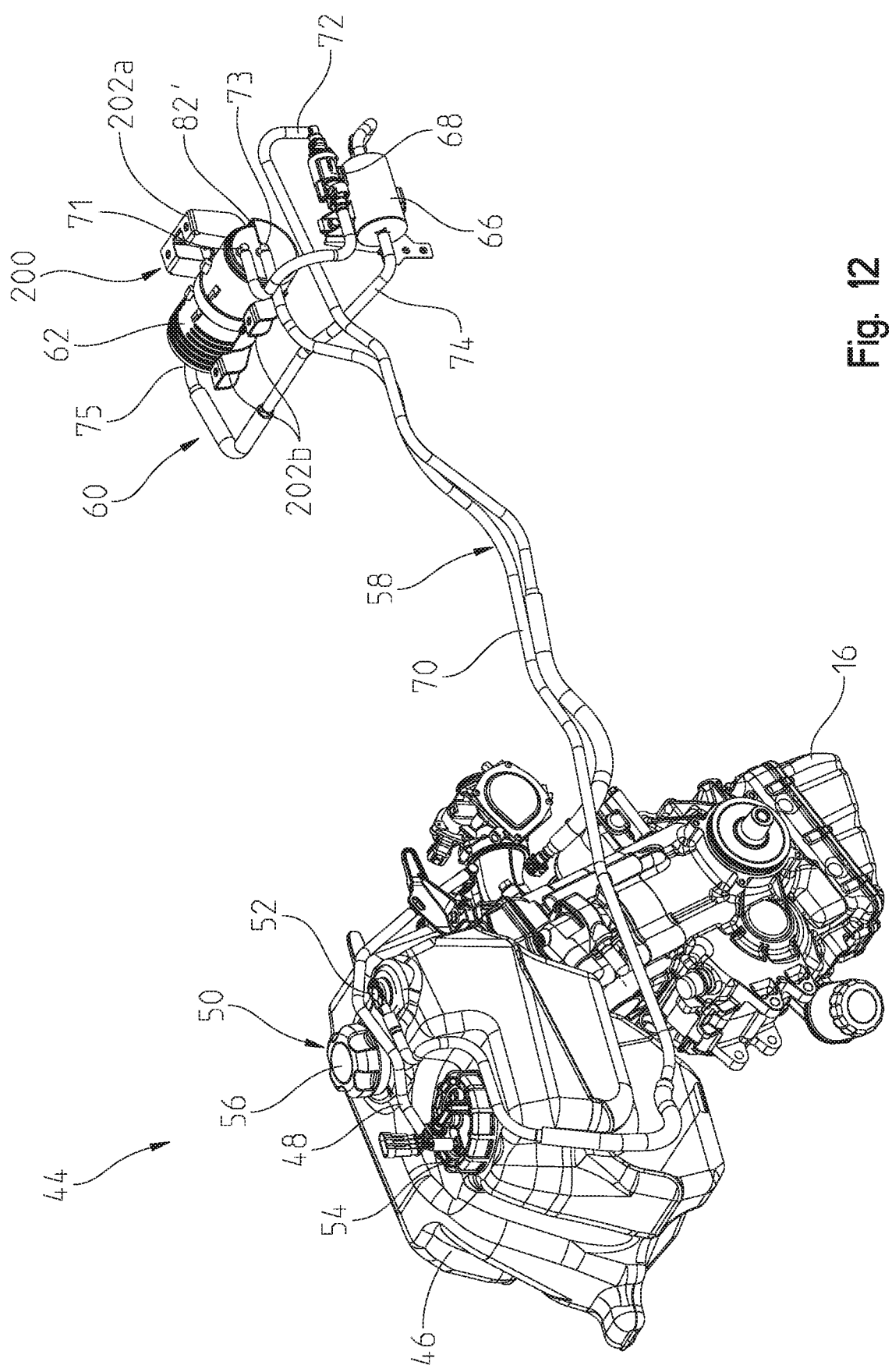
FIG. 12 shows a left front perspective view of the fuel system and the engine with a bracket for securing an evaporation canister of the fuel system to the vehicle.
Figure 13:
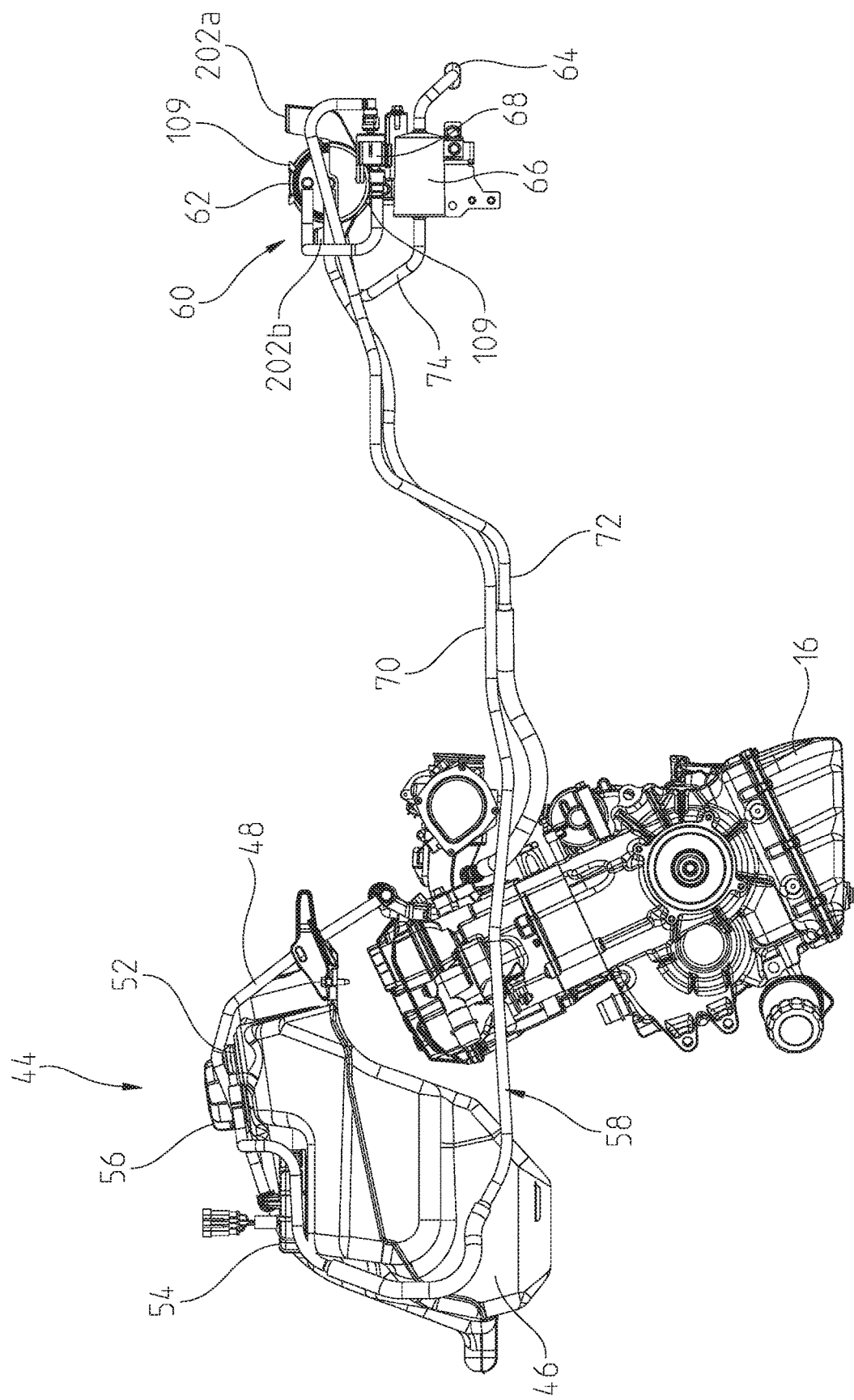
FIG. 13 shows a left side view of the fuel system, the engine, and the bracket of FIG. 12.

Furthermore, with reference now to FIG. 11, evaporation canister 62 is generally positioned in close proximity to exhaust assembly 18 with a heat shield 19 positioned between exhaust assembly 18 and evaporation canister 62 (FIG. 11). Due to the proximity of exhaust assembly 18, purging of evaporation canister 62 is improved due to the fact that the heat produced by exhaust assembly 18 helps keep the fuel vapor in vapor form rather than allowing the vapor to cool and condense into liquid form. If liquid fuel reaches evaporation canister 62, some of the carbon within canister 62 can be permanently filled, thereby reducing the working capacity of canister 62. Therefore, evaporation canister 62 is positioned at a height substantially similar to that of vapor exit port 52 such that gravity does not affect the fuel vapor traveling from fuel tank 46 to evaporation canister 62 and helps keep the fuel vapor in vapor form rather than condensing to liquid form. If canister is much farther below fuel tank vent, gravity would pull any condensed fuel vapor into the canister which should be avoided as was noted. As such, both evaporation canister 62 and vapor exit port 52 are positioned within an upper half of ATV 10 above longitudinal frame member 41, a bottommost extent of seat 42, and an uppermost extent of the engine. In various embodiments, the difference between the height of evaporation canister 62 and the height of vapor exit port 52 may be approximately 6 inches or less. The length of fuel vapor load line 70, which extends from fuel tank 46 past seat 42 to evaporation canister 62, also allows for any condensed fuel within line 70 to eventually evaporate again before traveling to evaporation canister 62, or at least requires condensed fuel to take longer to get to evaporation canister 62 such that the life of evaporation canister 62 may be extended.

Referring to FIGS. 4-11, ATV 10 further includes a storage container 76 supported by a rear end of frame assembly 36 and positioned rearward of seat 42 and fuel tank 46. Storage container 76 includes a top lid portion 78 and a bottom storage portion 80, where top lid portion 78 and bottom storage portion 80 may be separate components configured to couple together or a single, unitary component. An upper-facing surface 84 of top lid portion 78 generally includes a recess 82 configured to receive evaporation canister 62 such that evaporation canister 62 is positioned between upper-facing surface 84 of storage container 76 and rear body panel 32. In various embodiments, at least a portion of evaporation canister 62 is positioned above an uppermost extent of storage container 76. Upper surface 84 also includes a plurality of channels 86 configured to receive fuel vapor line 58 and/or air intake line 74. Recess 82 is positioned in the middle of top portion 78 between a forward edge 88, a rearward edge 90, and two side edges 92, 94 such that evaporation canister 62 is not visible from plain view. In other words, evaporation canister 62 is not visible when positioned within recess 82 of storage container 76, and storage container 76 and rear body panel 32 are coupled to frame assembly 36. In various embodiments, recess 82 and/or channels 86 may include one or more retention member (i.e., ribs 96 or legs) (FIG. 9) configured to retain evaporation canister 62, fuel vapor line 58 and/or air intake line 74. In an illustrative embodiment, the plurality of channels in upper surface 84 include two channels 86a configured to receive fuel vapor load line 70 of fuel vapor line 58 and three channels 86b configured to receive air intake line 74.

Referring to FIG. 2, in various embodiments, storage container 76 further includes an access panel or door 31 coupled to top lid portion 78 and/or bottom storage portion 80 and facing the rear of ATV 10 such that storage container 76 is accessible from the rear of ATV 10. Access panel 31 may be coupled via a living hinge, a conventional hinge, a removable coupler, or any other coupling mechanism. Accordingly, ATV 10 does not lose functional storage while allowing for the addition of evaporative emissions control assembly 60 and evaporation canister 62. In addition, placement of evaporation canister 62 in upper-facing surface 84 of top lid portion 78 of storage container 76 keeps evaporation canister 62 out of sight and generally inaccessible while also allowing evaporation canister 62 to be positioned in such a way that gravity does not affect the fuel vapor traveling from fuel tank 46 to evaporation canister 62.

With reference to FIGS. 4-11, in various embodiments, air intake line 74 and/or fuel vapor line 58 may include a heat shield or be made of a material with sufficient heat resistant properties at least within an outer layer to protect air intake line 74 and/or fuel vapor line 58 from the heat produced by exhaust assembly 18. Because air intake line 74 passes between storage container 76 and exhaust assembly 18 and fuel vapor line 58 extends near exhaust assembly 18, the heat shield and/or heat resistant materials protect and maintain the components of evaporative emissions control assembly 60. In addition, air intake line 74 and/or fuel vapor line 58 may be formed of a multilayer rubber where an interior layer is formed of a material having sufficient chemical resistant properties for coming in contact with fuel.

With reference to FIGS. 6 and 8-11, in various embodiments, top lid portion 78 of storage container 76 may further include a drain spout 98. Drain spout 98 may be formed in upper surface 84 of top portion 78, and is configured to allow water and/or debris that on top lid portion 78 or within recess 82 to drain out of top lid portion 78. Drain spout 98 is a channel extending from recess 82 to a forwardmost extent of top portion 78 that includes an inlet 100 within or along a front edge 81 of recess 82 and an outlet 102 along front edge 88 of top lid portion 78. In various embodiments, drain spout 98, inlet 100 and outlet 102 may be U-shaped, and fuel vapor line 58 and/or air intake line 74 may intersect and extend over and/or through drain spout 98. In an exemplary embodiment, drain spout 98 is also angled from inlet 100 within recess 82 to outlet 102 such that inlet 100 is positioned higher than outlet 102.

Still referring to FIGS. 6 and 8-11, in various embodiments, top lid portion 78 further includes a securing assembly 104 for securing evaporation canister 62 within recess 82. In an illustrative embodiment, securing assembly 104 includes a strap 106 and a hook 107. Strap 106 includes a first end 108 configured to be held in place by a loop or securing member 110 coupled to upper surface 84 of top portion 76, and a second end 112 configured to couple with hook 107 extending upward from upper surface 84. Strap 106 may be formed of various materials, for example strap 106 may be made of a multilayer rubber having sufficient chemical and heat resistance properties to prevent strap 106 from melting or degrading due to the heat of exhaust assembly 18. In various embodiments, strap 106 extends between extension members 109 such that the width of strap 106 is the same width as the space between extension members 109. Having strap 106 be the same width as the space between extension member 109 allows for a reduction in vibration and side-to-side motion of canister 62.

Referring now to FIGS. 12-16, in various embodiments, a bracket 200 may be formed with a shape or recess 82' similar to recess 82 that includes tabs or extensions 202 for coupling bracket 200 to a lower surface 33 (FIG. 11) of rear body panel 32. In various embodiments, bracket 200 includes a single extension on both sides of bracket 200 configured to couple bracket 200 to rear body panel 32, while in other various embodiments, bracket 200 includes a plurality of tabs 202 on both sides of bracket 200 configured to couple bracket 200 to rear body panel 32. In still yet other various embodiments, bracket 200 includes a single extension 202a on one side and multiple extensions 202b on the other side of bracket 200 configured to couple bracket 200 to rear body panel 32. In various embodiments, rear body panel 32 may include one or more downward extensions or dog house mount features for coupling extensions 202 of bracket 200 to rear body panel 32. Bracket 200 allows canister 62 to be coupled between an upper surface of bracket 200 and lower surface 33 of rear body panel 32.

Figure 14:
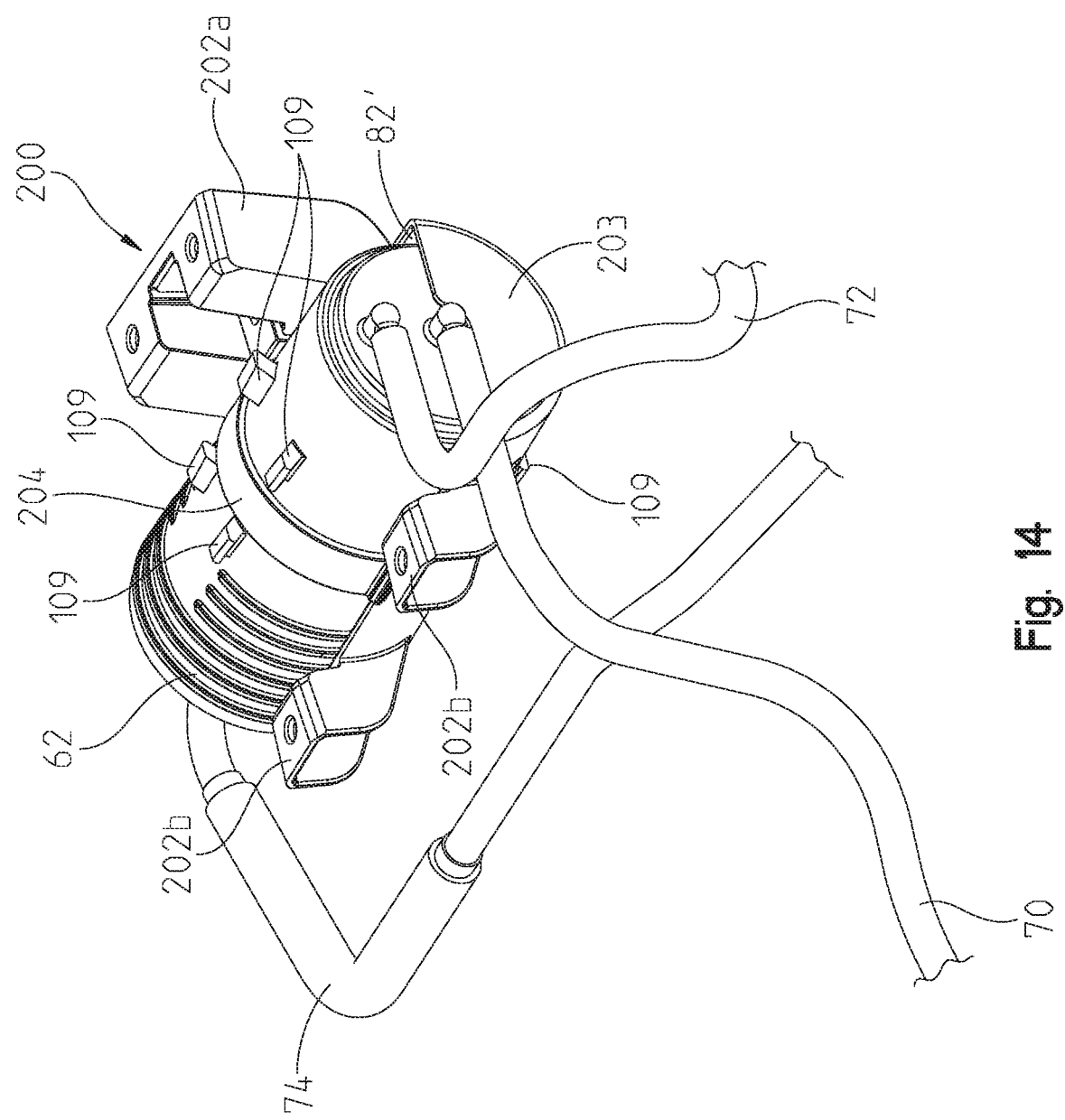
FIG. 14 shows a left front perspective view of the bracket and the evaporation canister of the fuel system of FIG. 12.
Figure 15:
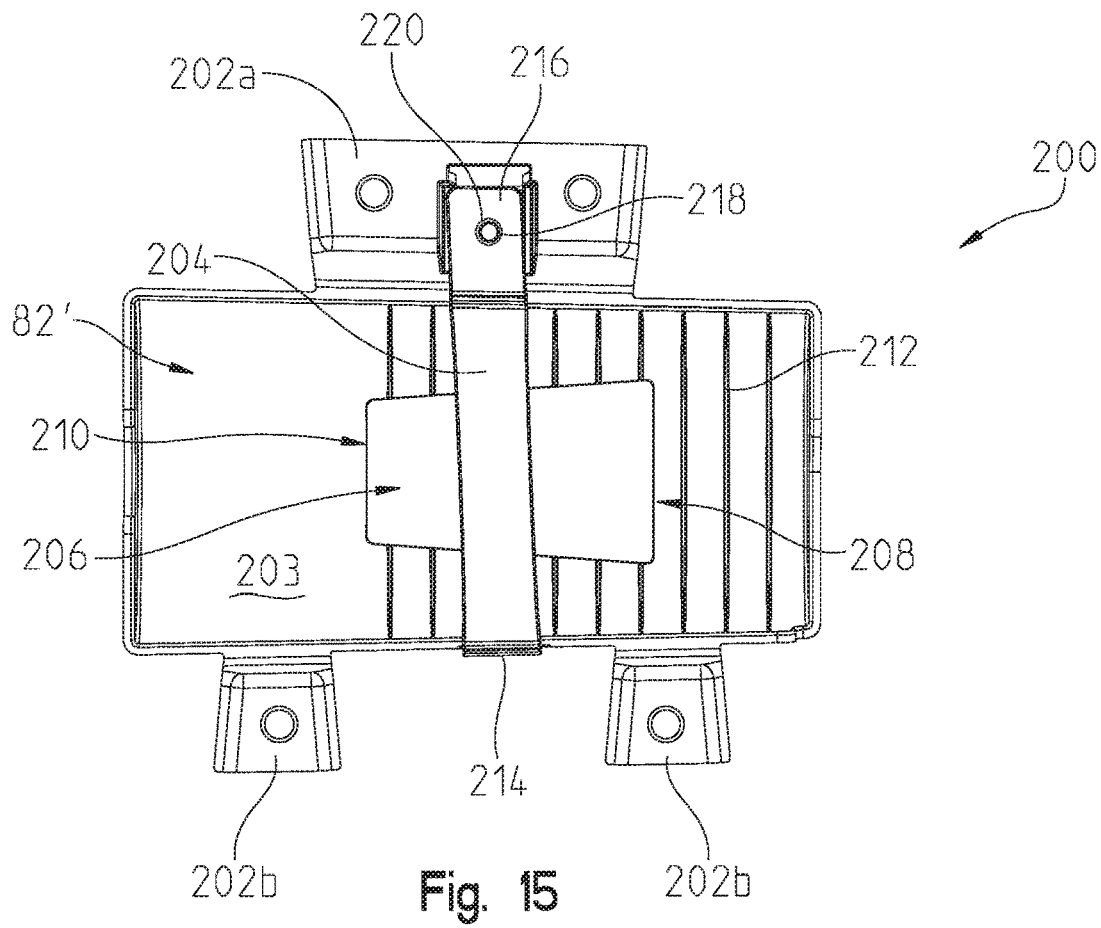
FIG. 15 shows a top plan view of the bracket of FIG. 12 with the evaporation canister removed.
Figure 16:
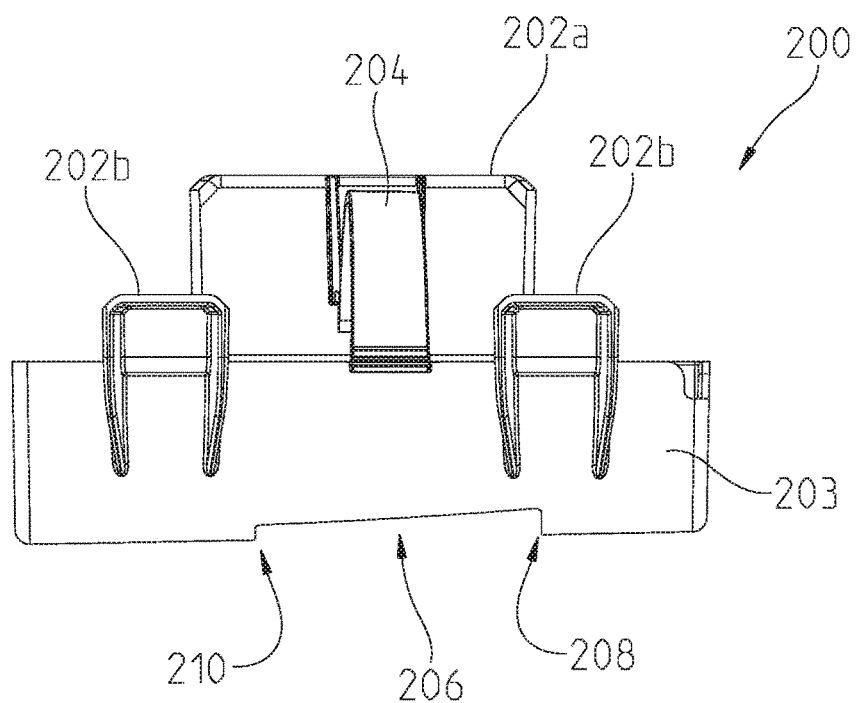
FIG. 16 shows a front plan view of the bracket of FIG. 12 with the evaporation canister removed.

With reference to FIGS. 14-16, bracket 200 generally includes a body 203 and a coupling mechanism 204 for securing canister 62 within body 203 of bracket 200. Body 203 generally includes extensions 202 and an opening 206 in the bottom of body 203 configured to fit extensions 109 of canister 62. In various embodiments, opening 206 includes a first end 208 and a second end 210, where first end 208 is wider than second end 210 similar to the spacing of extensions 109 such that extensions 109 of canister 62 fit snuggly through opening 206, and canister 62 cannot be installed incorrectly. Opening 206 is also configured to allow debris or fluid to escape bracket 200 to avoid debris/fluid build up within bracket 200. In various embodiments, body 203 may also include ribs/indentions 212 to match or fit with ribs/indentions in canister 62.

In various embodiments, coupling mechanism 204 of bracket 200 may be a living hinge including a hinge end 214 and free end 216, where free end 216 includes an opening 218 for receiving a coupler (i.e., self-tapper, snap input or clip, etc.) (not shown) for coupling free end 216 of living hinge 204 to opening 220 of body 203 of bracket 200. Opening 220 of bracket 200 generally includes additional material to allow free end 216 of living hinge 204 to be coupled to body 203 with the coupler.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. An all-terrain vehicle ("ATV") comprising:
   a frame;
   a plurality of ground engaging members supporting the frame;
   a straddle seat coupled to the frame for supporting at least one rider;
   a powertrain assembly operably coupled to the ground engaging members, the powertrain assembly comprising an engine;
   a storage container coupled to the frame at a position rearward of the straddle seat, the storage container comprising an enclosed, interior volume, and an exterior surface of the storage container including a recess, the exterior surface at least partially defining the interior volume; and
   a fuel system fluidly coupled to the engine, the fuel system including a fuel tank, a fuel vapor line fluidly coupling the fuel tank to the engine, and an evaporation canister positioned along the fuel vapor line, wherein the evaporation canister is positioned within the recess in the exterior surface of the storage container.

2. The ATV of claim 1, wherein a shape of the recess is complementary to a shape of the evaporation canister.

3. The ATV of claim 1, wherein the recess is within an upper-facing surface of the exterior surface of the storage container, and the upper-facing surface further includes at least one channel, the at least one channel configured to receive the fuel vapor line.

4. The ATV of claim 3, wherein the at least one channel includes at least one rib configured to hold the fuel vapor line in place.

5. The ATV of claim 1, wherein the storage container further includes a securing device, the securing device configured to hold the evaporation canister in place.

6. The ATV of claim 5, wherein the securing device includes a strap and a hook.

7. The ATV of claim 1, further comprising a body having a front body panel and a rear body panel, wherein the storage container is positioned below the rear body panel and at least a portion of the evaporation canister is positioned between an upper-facing surface of the exterior surface of a top portion of the storage container and the rear body panel.

8. The ATV of claim 1, wherein the fuel system further includes an air intake line, and the fuel vapor line includes a fuel vapor load line fluidly coupling the fuel tank to the evaporation canister and a fuel vapor purge line fluidly coupling the evaporation canister to the engine.

9. The ATV of claim 8, wherein the recess is within an upper-facing surface of the exterior surface of a top portion of the storage container, and the upper-facing surface further includes a plurality of channels, the plurality of channels configured to support at least one of the fresh air intake line, the fuel vapor load line, and the fuel vapor purge line.

10. The ATV of claim 1, wherein the recess is within an upper-facing surface of the exterior surface of a top portion of the storage container, and the upper-facing surface further includes a drain spout.

11. The ATV of claim 1, wherein the frame includes a longitudinal frame member, the straddle seat being coupled to the longitudinal frame member, and the fuel tank and the evaporation canister both being positioned vertical higher than the longitudinal frame member.

12. The ATV of claim 1, wherein the fuel system further includes a vapor exit point, the vapor exit point and the evaporation canister both being positioned above a bottommost extent of the straddle seat.

13. A vehicle comprising:
    a frame;
    a body supported by the frame, the body having a front body panel and a rear body panel;
    a plurality of ground engaging members supporting the frame;
    a seat coupled to the frame for supporting at least one rider;
    a powertrain assembly operably coupled to the ground engaging members, the powertrain assembly comprising an engine;
    an indented member defining a portion of an upper-facing exterior surface of a storage container, the storage container comprising an enclosed, interior volume, the indented member positioned rearward of the seat; and
    a fuel system fluidly coupled to the engine, the fuel system including a fuel tank, a fuel vapor line fluidly coupling the fuel tank to the engine, and an evaporation canister positioned along the fuel vapor line, wherein at least a portion of the evaporation canister is positioned between an upper-facing surface of the indented member and a bottom surface of the rear body panel.

14. The vehicle of claim 13, wherein the upper-facing surface of the indented member includes a shape complementary to a shape of the evaporation canister.

15. The vehicle of claim 13, wherein the fuel tank includes a vapor exit port, the vapor exit port and the evaporation canister being positioned above a lowermost extent of the seat.

16. The vehicle of claim 15, wherein the vehicle has an upper half and a lower half, the vapor exit port, the evaporation canister, and the seat being positioned entirely within the upper half of the vehicle.

17. The vehicle of claim 15, wherein the vapor exit port and the evaporation canister are positioned higher than an uppermost extent of the engine.

18. The vehicle of claim 13, wherein the fuel vapor line includes a fuel vapor load line fluidly coupling the fuel tank to the evaporation canister and a fuel vapor purge line fluidly coupling the evaporation canister to the engine, and the seat includes a longitudinal length, the fuel vapor load line extending from forward of the seat to rearward of the seat, a length of the fuel vapor load being greater than the longitudinal length of the seat.

19. A storage container configured to be coupled to a frame of a vehicle and positioned longitudinally rearward of a fuel tank of the vehicle, the storage container including:
- a top portion including an upper-facing exterior surface having a recess configured to receive an evaporation canister of the vehicle and a plurality of channels, the evaporation canister of the vehicle fluidly coupled to the fuel tank supported by the frame;
- a bottom storage portion configured to be coupled to a rear portion of the frame of the vehicle, the bottom storage portion configured to support the top portion; and
- the top portion and bottom portion configured to create an enclosed, interior volume configured to receive removable storage.

20. The storage container of claim 19, wherein the upper-facing exterior surface of the top portion further includes a drain spout having an inlet and an outlet, the inlet being in fluid communication with the recess and the outlet terminating at an edge of the top portion.

21. The storage container of claim 19, wherein the plurality of channels each include at least one retention member.

22. The storage container of claim 19, further comprising a first securing element extending from the upper-facing exterior surface of the top portion and a second securing element configured to couple with the first securing element to hold the evaporation canister within the recess.

23. The storage container of claim 19, further comprising an access panel.

* * * * *